(12) United States Patent
Volpe et al.

(10) Patent No.: US 7,918,133 B2
(45) Date of Patent: Apr. 5, 2011

(54) LIQUID LEVEL SENSING APPARATUS

(75) Inventors: Frank Volpe, North Haven, CT (US);
Peter Perry, North Brandford, CT (US);
Albert Torelli, Wallingford, CT (US)

(73) Assignee: EZ Form Cable Corporation, Hamdem, CT (US)

( * ) Notice: Subject to any disclaimer, the term of this patent is extended or adjusted under 35 U.S.C. 154(b) by 516 days.

(21) Appl. No.: 12/062,842

(22) Filed: Apr. 4, 2008

(65) Prior Publication Data
US 2009/0249870 A1 Oct. 8, 2009

(51) Int. Cl.
*G01F 23/00* (2006.01)
(52) U.S. Cl. ...................................... 73/290 R
(58) Field of Classification Search ............... 73/209 R, 73/290 C
See application file for complete search history.

(56) References Cited

U.S. PATENT DOCUMENTS

| | | | |
|---|---|---|---|
| 3,703,829 A | 11/1972 | Dougherty | |
| 4,417,473 A * | 11/1983 | Tward et al. | 73/304 C |
| 5,457,990 A * | 10/1995 | Oswald et al. | 73/290 V |
| 5,781,019 A | 7/1998 | Telder | |
| 6,644,114 B1 | 11/2003 | McEwan | |
| 6,690,320 B2 | 2/2004 | Benway et al. | |
| 6,938,478 B2 | 9/2005 | Arias | |

* cited by examiner

*Primary Examiner* — Hezron Williams
*Assistant Examiner* — Alex Devito
(74) *Attorney, Agent, or Firm* — Gerald E. Hespos; Michael J. Porco

(57) ABSTRACT

A fluid level gauge assembly for measuring a level of a fluid in a fluid container is provided. The fluid level gauge assembly includes a first coaxial cable section having a first end and a second end, the first coaxial cable section including a first center conductor, a first outer conductor and a solid dielectric between the first center and outer conductor; a second coaxial cable section having a first end and a second end, the second coaxial cable section including a second center conductor, a second outer conductor and an air dielectric between the second center and outer conductor; and a coupling between the second end of the first coaxial cable section and the first end of the second coaxial cable section. The second coaxial cable section being disposed in a fluid for determining a level of the fluid.

9 Claims, 5 Drawing Sheets

LIQUID LEVEL SENSING APPARATUS

BACKGROUND OF THE INVENTION

1. Field of the Invention

The invention relates to an apparatus for precisely measuring the level of a liquid.

2. Description of the Related Art

Most vehicles, including cars, trucks aircraft and boats include fuel tanks and sensors for detecting the level of fuel in the fuel tank. One common fuel level sensor includes a float that will ride approximately on the surface of the liquid fuel in the fuel tank. Thus, the float will move vertically in the fuel tank as the amount of fuel in the tank varies. The float may be disposed to slide along a detector and the relative position of the float along the detector provides an indication of the level of fuel in the tank. Fuel level sensors that rely upon a float are mechanically complicated, costly and imprecise. Furthermore, a problematic fuel level float is very difficult to repair or replace without removing and disassembling a significant part of the fuel system of the vehicle.

Time domain reflectometers are used to measure the length of a coaxial cable and have been used to measure the level of a liquid. An example of the use of time domain reflectometers to measure a quantity of liquid is shown in U.S. Pat. No. 3,703,829. More particularly, U.S. Pat. No. 3,703,829 relates to a system that mounts a coaxial cable vertically in a tank. The coaxial cable has a center conductor, an outer conductor and an air dielectric between the center conductor and the outer conductor. Electrical signal pulses are generated and applied to the upper end of the center conductor of the coaxial cable. The signals travel down the center conductor and are reflected at the fluid surface. The volume of fluid in the tank is a function of the time delay between the application of the pulse and the receipt of the surface-reflected pulse. The time domain reflectometer technology of U.S. Pat. No. 3,703,829 can work well if the tank and time domain reflectometer can be designed concurrently and if space is not an issue. Most tank level gauges do not rely on time domain reflectometers and cannot be retrofitted easily for the type of time domain reflectometer disclosed in U.S. Pat. No. 3,703,829.

Accordingly, an object of the invention is to provide a fluid level gauge that enables time domain reflectometer technology to be retrofitted into an existing tank.

SUMMARY OF THE INVENTION

The invention relates to a fluid level gauge assembly that comprises a first coaxial cable section, a second coaxial cable section and a coupling between the first and second coaxial cable sections. The first coaxial cable section has a center conductor, outer conductor and a dielectric between the center and outer conductors. The dielectric of the first coaxial cable section preferably is a solid dielectric, such as Teflon. The first coaxial cable section has an outer end and an inner end. The outer end of the first coaxial cable section is configured for connection to a time domain reflectometer.

The second coaxial cable section of the fluid level gauge assembly has a center conductor, an outer conductor and an air dielectric between the center and outer conductors. The center conductor of the second coaxial cable section may be a unitary extension of the center conductor of the first coaxial cable section. The second coaxial cable section has a lower end disposed to be below the surface of the fluid for all levels of fluid and an upper end to be disposed above the surface of the fluid for all levels of fluid. A cap may be mounted to one end of the second coaxial cable section and may assist keeping the coaxial arrangement of the center and outer conductors of the second coaxial cable section. The cap has at least one opening to permit fluid or air to flow into the space between the center and outer conductors of the second coaxial cable section.

The coupling of the fluid level gauge assembly has a center conductor, an outer conductor and a dielectric extending therebetween. The center conductor of the coupling preferably is a unitary extension of the center conductor of the first coaxial cable section and preferably continues unitarily to define the center conductor of the second coaxial cable section. The outer conductor of the coupling connects the outer conductors of the first and second coaxial cable sections. At least part of the dielectric of the coupling is an air dielectric and communicates with the air dielectric of the second coaxial cable section. Additionally, the outer conductor of the coupling has at least one vent hole to provide communication between the air dielectrics of the coupling and the second coaxial cable section to the ambient surroundings. The coupling preferably is configured to permit the first and second coaxial cable sections to be aligned at an angle to one another.

The angle of the coupling and the lengths of the first and second coaxial cable sections are selected in view of the size and shape of the fluid container and the space available outside the container for electrical connection to the time domain reflectometer. Furthermore, the ability to choose the angle of the coupling and the lengths of the first and second coaxial cable sections enables the fluid level gauge assembly to be fit into an existing fluid system, such as an existing fuel system. Accordingly, the fluid level gauge assembly can be designed and dimensioned to replace a less efficient fluid level system, such as a system that relies upon a float.

The fluid level gauge assembly may be manufactured by providing a coaxial cable with a solid dielectric. Selected lengths of the outer conductor and the dielectric then are removed from one end of the coaxial cable to leave a selected length of the center conductor exposed. The exposed end portion of the center conductor then may be bent at a position near the remaining parts of the dielectric and the outer conductor. The coupling then may be mounted to surround part of the outer conductor and may be secured by brazing or the like. A tubular outer conductor then may be mounted over the exposed end portion of the center conductor and may be secured to the coupling by brazing or the like. An end cap may be mounted to the end of the tubular outer conductor opposite the coupling to maintain the concentric relationship between the exposed center conductor and the tubular outer conductor. The portion of the coaxial cable that does not have the outer conductor and the dielectric removed define the above-described first coaxial cable section. The exposed inner conductor and the tubular outer conductor define the above-described second coaxial cable section. The order of the manufacturing steps may be varied. For example at least part of the bending of the center conductor can be carried out after the coupling is positioned.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION OF THE PREFERRED EMBODIMENT

Preferred embodiments of the present disclosure will be described hereinbelow with reference to the accompanying drawings. In the following description, well-known functions or constructions are not described in detail to avoid obscuring the present disclosure in unnecessary detail.

Figure 1:
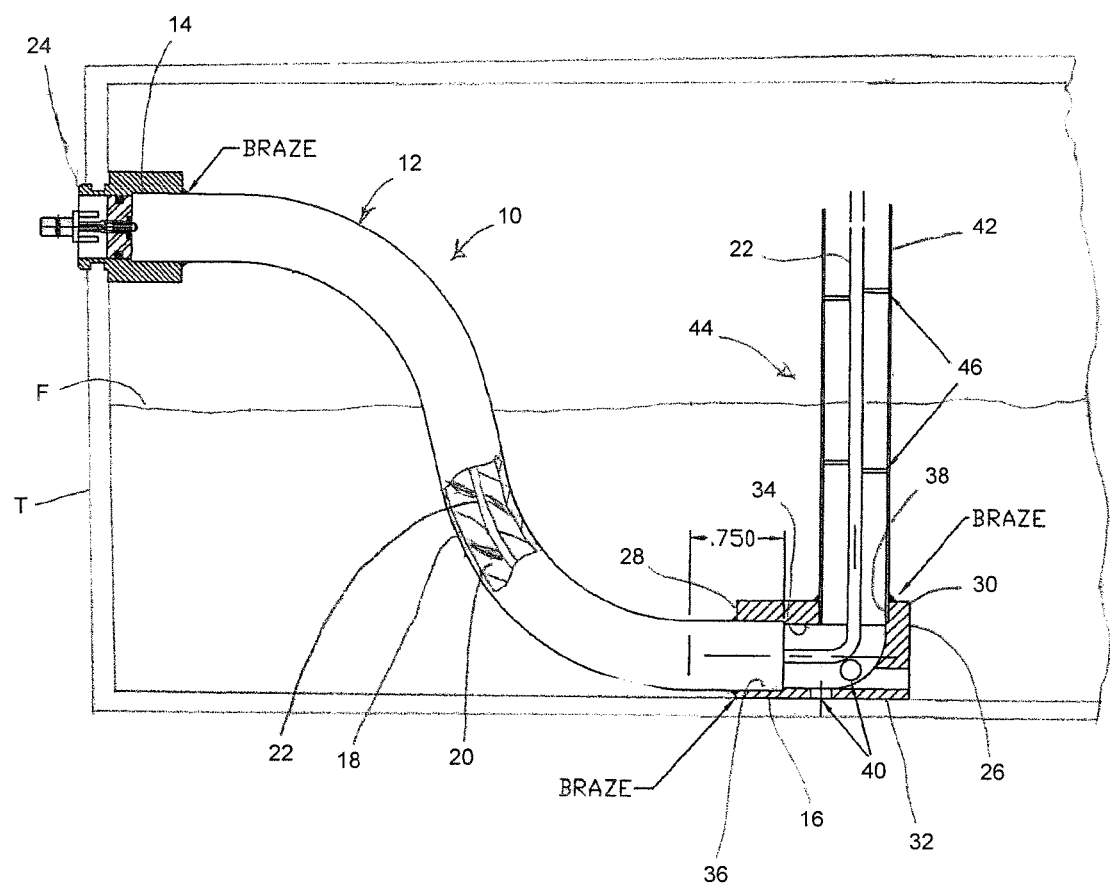
FIG. 1 is a side elevational view, partly in section of a fluid level gauge assembly in accordance with the invention.
Figure 2:
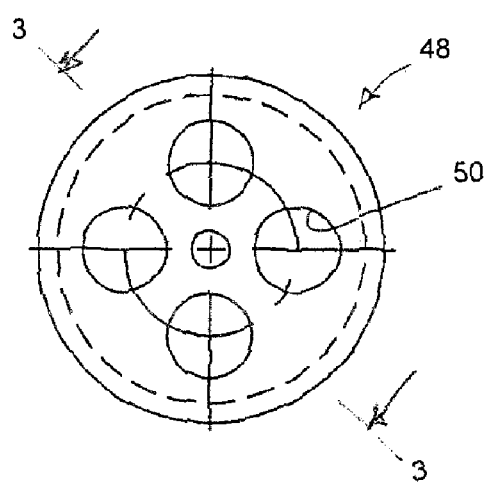
FIG. 2 is an end elevational view of an optional end cap for mounting on the lower end of the inner cable.
Figure 3:
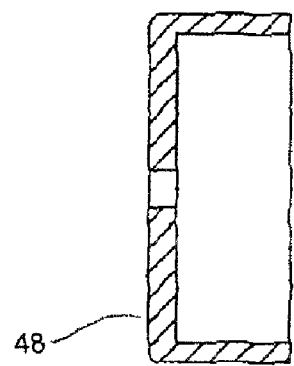
FIG. 3 is a cross-sectional view taken along line 3-3 in FIG. 2.

A fluid level gauge assembly in accordance with the invention is identified by the numeral 10 in FIGS. 1 to 3. The fluid level gauge assembly 10 is used in this embodiment to measure the level of fuel F in a fuel tank T. However, the fluid level gauge assembly 10 can be used to measure levels of fluid in other environments, e.g., a fluid container.

The fluid level gauge assembly 10 includes a first coaxial cable section 12 that has opposite outer and inner ends 14 and 16. The first coaxial cable section 12 also has an outer conductor 18, a solid dielectric 20 and a center conductor 22. The outer conductor 18 and the solid dielectric 20 extend from the outer end 14 to the inner end 16 of the first coaxial cable section 12. The center conductor 22 extends from the outer end 14 of the first coaxial cable section 12 beyond the inner end 16 thereof. A coaxial connector 24 is mounted to the outer end 14 of the first coaxial cable section 12 and extends partly through a side wall of the tank T. The coaxial connector 24 can be connected to a time domain reflectometer (not shown).

The fluid level gauge assembly 10 further includes a coupling 26 with opposite first and second ends 28 and 30. A conductive side wall 32 extends between the ends 28 and 30 of the coupling 26 and a nonlinear passage 34 extends through the coupling from the first end 28 to the second end 30. The passage 34 includes a first section 36 adjacent the first end 28 of the coupling 26 and a second section 38 adjacent the second end 30 of the coupling 26. In the illustrated embodiment, the first and second sections 36 and 38 of the passage 34 are aligned at a right angle. However, other angular alignments are possible. Portions of the first section 36 of the passage 34 are configured to telescope onto the outer conductor 18 at the inner end 16 of the first coaxial cable section 12. Holes or apertures 40 pass through the coupling 26. The center conductor 22 extends through the passage 34 and beyond the second end 30 of the coupling 26.

The fluid level gauge assembly 10 further includes a conductive tube 42 that coaxially surrounds the center conductor 22 and telescopes into second section 38 of the passage 34 at the second end 30 of the coupling 26. The conductive tube 42 then is brazed into engagement with the second end 30 of the coupling 26. The conductive tube 42 and portions of the center conductor 22 therein define a second coaxial cable section 44. In the illustrated embodiment, the second coaxial cable section 44 further includes a plurality of spaced apart supports 46 that extend substantially radially in from the conductive tube 42 to maintain the coaxial arrangement between the conductive tube 42 and the center conductor 22.

Figure 3A:
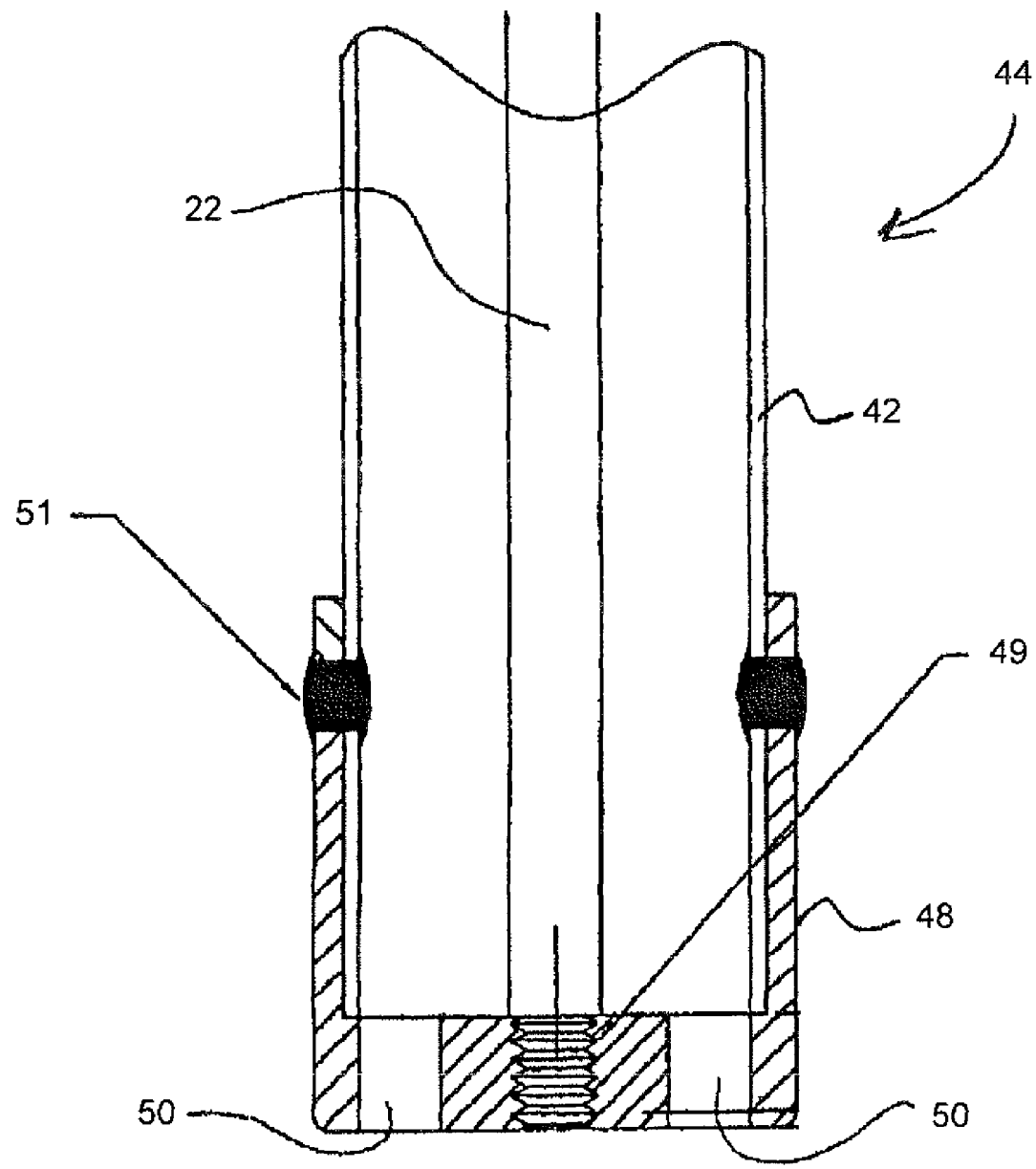
FIG. 3A is a cross-sectional view of another embodiment of an end cap for mounting on the lower end of the inner cable.

The second coaxial cable section 44 further includes an end cap 48, as shown in FIGS. 2, 3 and 3A, to contribute to the coaxial arrangement of the conductive tube 42 and the center conductor 22. The end cap 48 is formed with vent holes or apertures 50 for allowing movement of a fluid therethrough. In one embodiment, the end cap 48 is formed with a threaded aperture 49 configured for receiving the center conductor 22. The end cap 48 is disposed over the lower end of the conductive tube 42 and twisted on until the center conductor is fully received into the threaded aperture 49. Optionally, the end cap 48 will be secured by at least one rivet 51 to the conductive tube.

The fluid level gauge assembly 10 may be manufactured by providing the coaxial cable 12 with an outer end 14, an outer conductor 18, a solid dielectric 20 and a center conductor 22. The coaxial connector 24 then is connected to the outer end 14 of the coaxial cable 12. Selected lengths of the outer conductor 18 and the dielectric 20 then are removed from one end of the coaxial cable 12 to leave a selected length of the center conductor 22 exposed. The exposed end portion of the center conductor 22 is bent at a position near the remaining parts of the outer conductor 18 and the dielectric 20. The coupling 26 then is mounted to surround part of the outer conductor 18 and is secured by brazing. The conductive tube 42 then is mounted over the exposed end portion of the center conductor 22 and is brazed to the coupling 26. An end cap 48 is mounted to the end of the conductive tube 42 opposite the coupling 26 to maintain the concentric relationship between the exposed center conductor 22 and the conductive tube 42.

The fluid level gauge assembly 10 is mounted in the tank T so that the coupling 26 is substantially adjacent the bottom wall of the tank T and so that the end of the conductive tube 42 remote from the coupling 26 projects up in the tank T. Fuel F in the tank T will flow through the holes 40 and into the air dielectric between the center conductor 22 and the conductive tube 42. Air in the space between the center conductor 22 and the conductive tube 42 can escape through the holes 50 in the end cap 48. The position of the fuel along the center conductor 22 will vary in accordance with the level of fuel in the tank T. Signals then are generated external of the tank T and are directed into the center conductor 22 via the connector 24. The time domain reflectometer can determine the location of the interface between the fuel F in the gap between center conductor 22 and the conductive tube 42.

Figure 4:
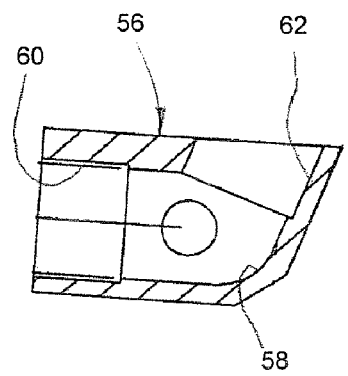
FIG. 4 is a cross-sectional view of an alternate coupling for use in the fluid level gauge assembly.
Figure 5:
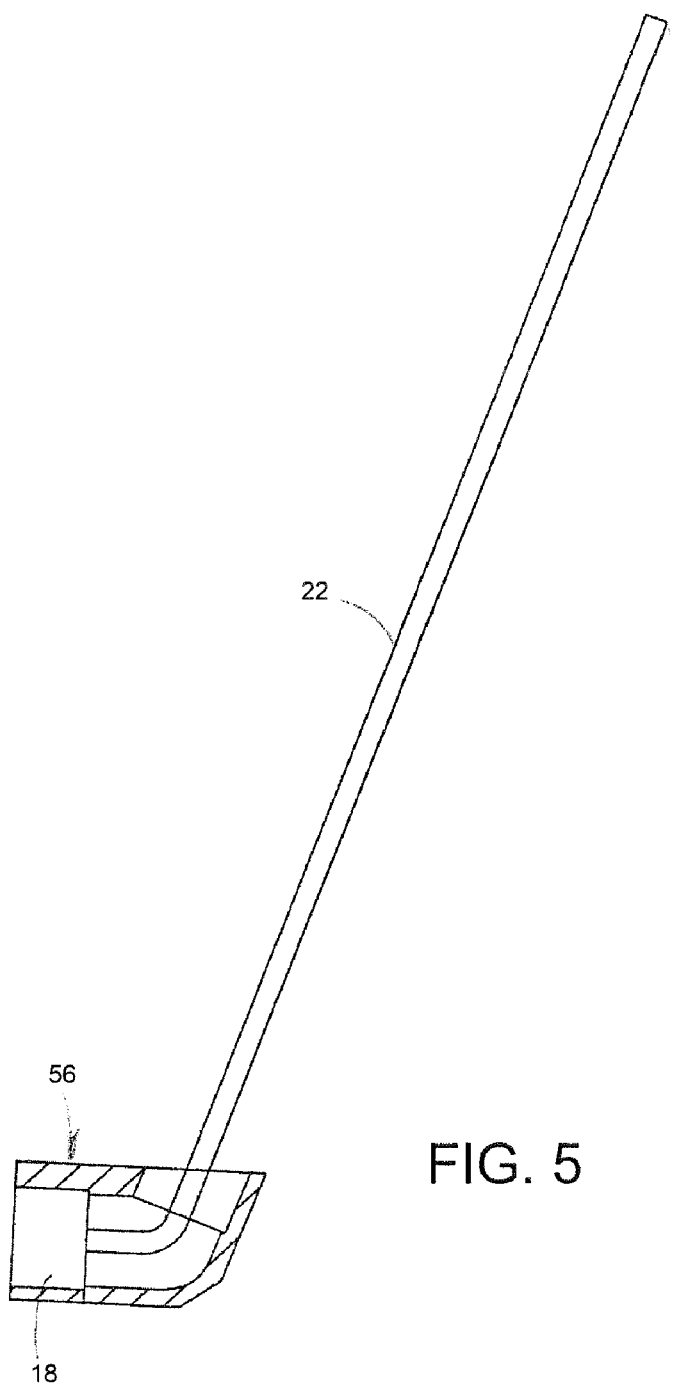
FIG. 5 is a cross-sectional view of the alternate coupling mounted on the first coaxial cable section.

The coupling 26 shown in FIG. 1, is a right angle coupling. However, other optional alignments are possible to meet the space limitations of a particular application. For example, an alternate coupling 56 is shown in FIGS. 4 and 5 and has a passage 58 extending therethrough. The passage 58 has first and second sections 60 and 62 that are aligned to one another at an angle of about 100 degrees.

The invention has been described with respect to a preferred embodiment. However, it is apparent that various changes can be made without departing from the scope of the invention. Several such options are described below.

Figure 6:
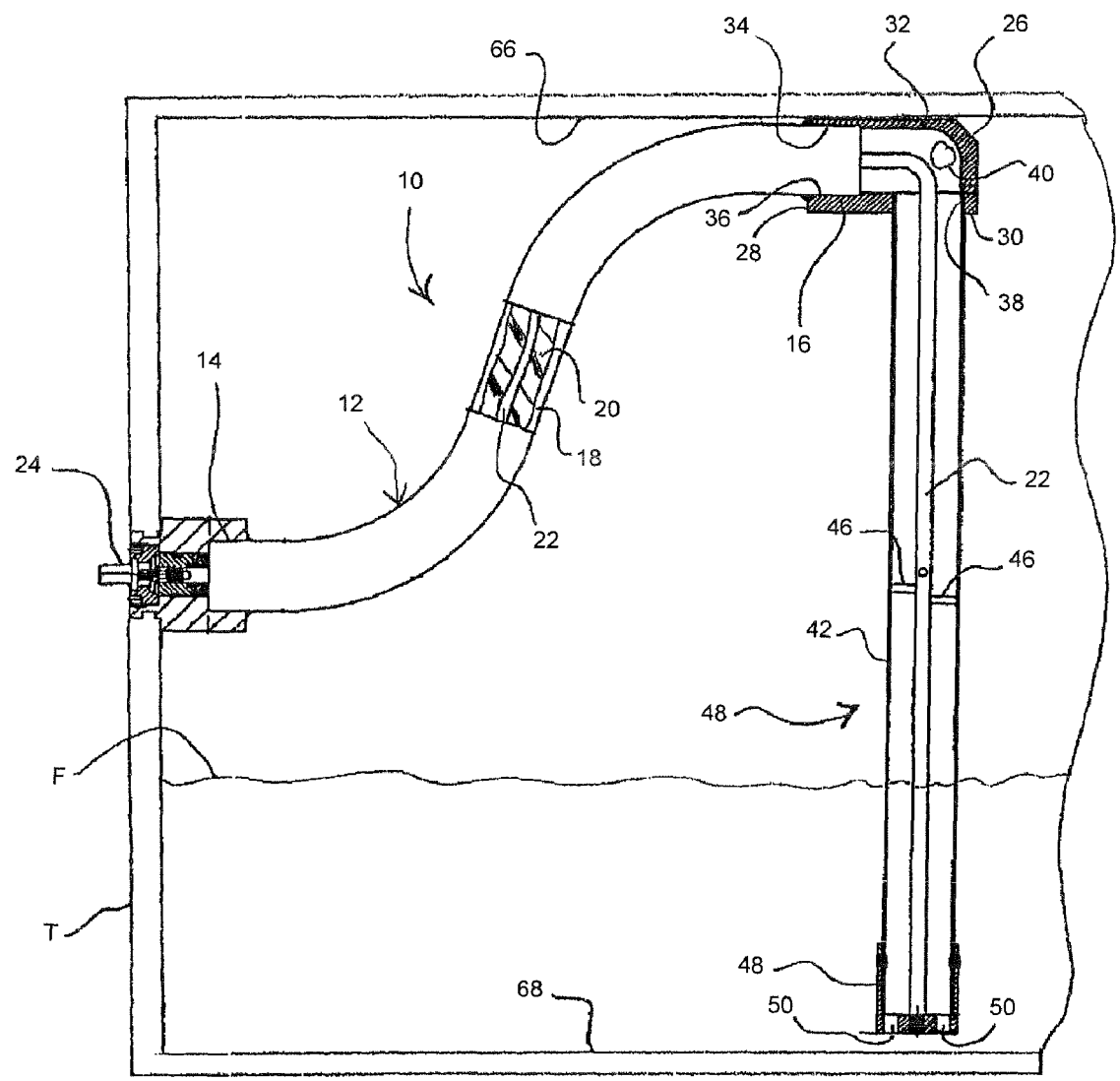
FIG. 6 is a side elevational view, partly in section of a fluid level gauge assembly in accordance with another embodiment of the invention where a coupling is mounted at a top of a fluid container.

The illustrated embodiments have the coupling 26 at the bottom end of the fluid level gauge assembly 10. However, the fluid level gauge assembly 10 can be mounted in an inverted orientation with the coupling 26 at the top 66 of the fluid container and the cap 48 at the lower or bottom end 68, as illustrated in FIG. 6. In this embodiment, the end cap 48 is positioned slightly above the bottom of the fuel tank to accommodate a flow of fluid via vent holes 50 into the space between the outer conductive tube 42 and the center conductor 22. Similar to the embodiments described above, the coupling 26 may be configured to provide other optional alignment angles to meet the space limitations of a particular application, as opposed to the 90 degree angle shown in FIG. 6.

The couplings 26 and 56 are shown as being of unitary construction. However, the couplings can be made of several parts that are assembled around the exposed parts of the center conductor 22.

The center conductor 22 is shown as extending continuously through the fluid level gauge assembly 10. However, the center conductor need not be unitary. For example, the coupling may be a coaxial connector, such as a right angle coaxial connector, that is connected to the first coaxial cable section 12. The second coaxial cable section then may be connected to the coaxial connector that is used in place of the coupling 26, 56.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A fluid level gauge assembly for measuring a level of a fluid in a fluid container, the fluid container including a top, a bottom and at least one side wall, the fluid level gauge assembly comprising:
    a first coaxial cable section having a first end and a second end, the first coaxial cable section including a first center conductor, a first outer conductor and a solid dielectric between the first center conductor and first outer conductor;
    a second coaxial cable section having a first end and a second end, the second coaxial cable section including a second center conductor, a second outer conductor and an air dielectric between the second center conductor and second outer conductor; and
    a coupling between the second end of the first coaxial cable section and the first end of the second coaxial cable section, the coupling being coupled to the top of the fluid container, wherein the second coaxial cable section is disposed in a fluid and with the second end of the second coaxial cable section positioned a predetermined distance from the bottom of the fluid container for determining a level of the fluid.

2. The fluid level gauge assembly as in claim 1, wherein the first end of the first coaxial cable section is configured for connection to a time domain reflectometer.

3. The fluid gauge assembly as in claim 1, wherein the coupling is configured to permit the first and second coaxial cable sections to be aligned at a predetermined angle to one another.

4. The fluid gauge assembly as in claim 1, further comprises an end cap disposed on the second end of the second coaxial cable section to maintain a coaxial arrangement of the second outer conductor and the second center conductor.

5. The fluid gauge assembly as in claim 4, wherein the end cap includes at least one vent aperture to permit fluid or air to flow therethrough.

6. The fluid gauge assembly as in claim 1, wherein the coupling is coupled to the bottom of the fluid container and the second end of the second coaxial cable section is disposed adjacent to the top of the fluid container.

7. The fluid gauge assembly as in claim 6, wherein the coupling includes a center conductor, an outer conductor and a dielectric extending therebetween.

8. The fluid gauge assembly as in claim 7, wherein at least part of the dielectric of the coupling is an air dielectric and communicates with the air dielectric of the second coaxial cable section.

9. The fluid gauge assembly as in claim 8, wherein the outer conductor of the coupling includes at least one vent aperture to provide communication between the air dielectrics of the coupling and the second coaxial cable section to the ambient surroundings.

* * * * *